United States Patent [19]

Biggio et al.

[11] Patent Number: 5,004,897
[45] Date of Patent: Apr. 2, 1991

[54] AUTOMATIC CONNECTING DEVICE DESIGNED FOR THE QUICK AND MOMENTARY SUPPLY OF POWER TO ELECTRONIC CIRCUITS

[75] Inventors: Alain Biggio, Limonest; Jacques Landrevie, La Chambre, both of France

[73] Assignee: Allflex Europe S.A., France

[21] Appl. No.: 232,629

[22] Filed: Aug. 15, 1988

Related U.S. Application Data

[63] Continuation-in-part of Ser. No. 765,261, Aug. 13, 1985, abandoned.

[51] Int. Cl.$^5$ .................... G06K 7/15; G06K 19/77
[52] U.S. Cl. .................... 235/441; 235/492; 235/375
[58] Field of Search ............. 235/492, 441, 375, 376, 235/385, 380, 487, 488; 364/550-552, 559; 324/73.1; 439/387, 439, 426, 376, 374, 64, 166, 170, 173, 246, 247; 371/20, 26, 27

[56] References Cited

U.S. PATENT DOCUMENTS

| | | | |
|---|---|---|---|
| 2,858,518 | 10/1958 | Chrystie et al. | 439/426 |
| 3,287,031 | 11/1966 | Simmons et al. | 439/376 |
| 4,380,070 | 4/1983 | Steiner | 324/73.1 |
| 4,499,371 | 2/1985 | Rose | 235/492 |
| 4,535,557 | 8/1985 | Porcher | 235/492 |
| 4,539,517 | 9/1985 | Flora | 371/27 |

*Primary Examiner*—Stuart S. Levy
*Assistant Examiner*—Robert Weinhardt
*Attorney, Agent, or Firm*—Remy J. VanOphem

[57] ABSTRACT

A device for the automatic and momentary electrical connection of the wires of a cable with the circuit of a memory. A sensor connects each wire of the cable with a telescopic tip and an electronic chip which connects the telescopic tips to a memory. As a button provided on the cover of the sensor is depressed, the telescopic tips pierce through a protecting film on the face of the electronic chip and provide electrical contact between the cable and the memory. The sensor and electronic chip each have a bevel gear, the teeth of which position the sensor relative to the electronic chip so that each engages an electrical contact on the surface of the electronic chip. An electronic circuit connected with the cable senses the angular position of each of the telescopic tips with reference to the electrical contacts. This device provides a momentary electrical contact with the electronic chip to read a memory or store data therein.

8 Claims, 3 Drawing Sheets

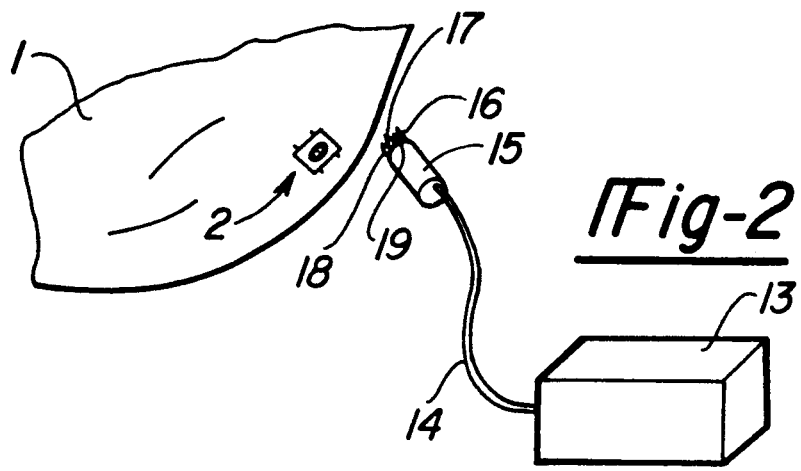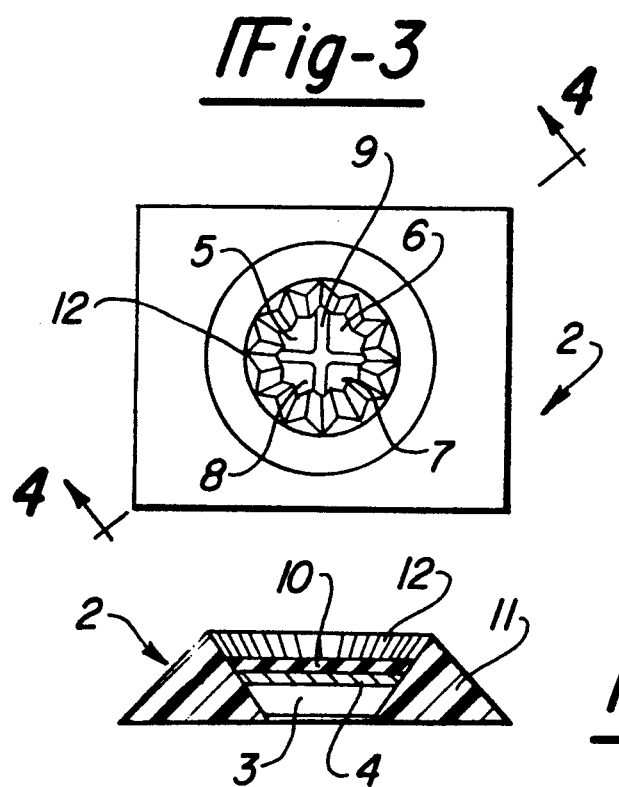

AUTOMATIC CONNECTING DEVICE DESIGNED FOR THE QUICK AND MOMENTARY SUPPLY OF POWER TO ELECTRONIC CIRCUITS

CROSS REFERENCE TO RELATED CASES

This application is a continuation-in-part of co-pending U.S. application Ser. No. 765,261, entitled Automatic Connecting Device Designed for the Quick and Momentary Supply of Power to Electronic Circuits filed Aug. 13, 1985 now abandoned.

BACKGROUND OF THE INVENTION

1. Field of the Invention

The present invention pertains to an automatic connecting device which can be used to quickly and momentarily supply power to electronic circuits.

2. Description of the Prior Art

Known electronic circuits are commonly interconnected by male pins and female sockets. This type of connector is operated by hand. However, its operation is relatively slow and requires alignment of both connector plugs before plugging them into one another. This method is awkward and in some applications impossible to use. This problem becomes critical when one of the two members is not stationary.

SUMMARY OF THE INVENTION

The present invention eliminates these disadvantages by offering a quick and automatic electronic connection system meeting the requirements of a great diversity of applications. Among these possible applications, the invented device may be used to identify animals or objects. On a farm, cattle are sometimes identified by means of a metal tag stapled in their ear. Throughout the life of the animal, the farmer will periodically read the information inscribed on the tag and record various data describing the evolution of the particular animal.

The present invention replaces the metal tag with a miniaturized electronic chip incorporating an electronic memory. On its outer surface, the electronic chip includes conductor areas. The electronic chip remains attached to the animal. Preferably, the electronic chip is attached to the animal's ear. When the farmer approaches, he carries an electronic device able to read the memory or modify it, thus, enabling him to inspect all of the cattle without having to physically write notes.

To perform this type of operation, the farmer must directly contact the electronic chip worn by the animal, so as to electrically connect it with a reading device. Obviously, this electrical contact poses practical problems, due to the movements of the animal.

The present invention solves this problem by offering a system which has a contact surface built into the electronic chip worn by the animal, as well as a sensor held by the user. The operator, thus, applies the sensor against the contact surface of the electronic clip, so as to initiate the electronic operations desired. The reading, the scanning, or the modification of the memory may be performed within a very short period of time, a fraction of a second for instance, without requiring any particular preparation to compensate for the movement of the animal.

Of course, the above described operation is not limited to this particular application. The device may also be used in medical, veterinary and farming applications, or any other field requiring the manual or automatic connection of electronic circuits attached to fixed or moving objects.

An automatic, quick connecting device includes an electronic chip having a contact surface and a sensor. The contact surface has a plurality of conductor areas that are insulated from one another, whereas the sensor has a like plurality of tips made of a conducting material which are designed to be applied against the contact surface of the electronic chip.

According to another object of the present invention, the sensor's metal tips are telescopic and biased outwardly by a return spring, so that when the sensor is applied against the contact surface of the electronic chip, the tips are biased against the contact surfaces of the electronic chip.

According to another object of the invention, the contact surface of the electronic chip is equipped to automatically provide angular positioning of the sensor when it is in contact with the contact surface.

According to another object of the invention, the conducting areas of the contact surface are arranged in circles or annular areas around a central geometrical axis. The angular positioning is accomplished by a gear provided on the electronic chip which meshes with a complementary gear provided on the sensor before the tips of the sensor come in contact with the contact surface. It can, therefore, be noted that the angular positioning of the sensor with reference to the contact surface is defined with a one tooth accuracy, which is automatically accomplished and eliminates the need for groping on the part of the operator. The engagement of the sensor with the electronic chip is improved when the teeth are bevelled and the general section of the gear tapered.

According to another object of the invention, the contact surface of the electronic chip is covered with a soft, pierceable insulating film for protection, whereas the tips of the sensor are sharp enough to pierce that film upon each operation.

According to another object of the invention, the electronic circuits of the device are such that, as soon as the tips come in contact with the conducting surface of the electronic chip, an initial phase takes place. During this initial phase, a low impedance measuring circuit determines with which sensor tip the conducting areas are, respectively, connected. Following this initial phase, the operating phase takes place and reads or modifies the memory content.

According to another object of the invention, the soft insulating film which protects the contact surface of the electronic chip is made of a self-healing synthetic material which seals itself after being pierced as soon as the sensor tip is removed.

The attached, schematic drawing will provide a better understanding of the invention.

BRIEF DESCRIPTION OF THE DRAWINGS

FIG. 1 illustrates a memory device, attached to the ear of an animal;

FIG. 2 illustrates the sensor and reading device used by the operator;

FIG. 3 is an enlarged top view of the memory device showing the detail thereof;

FIG. 4 is a cross-sectional view of the memory device taken along lines 4—4 of FIG. 3;

DETAILED DESCRIPTION OF THE PREFERRED EMBODIMENT

Figure 5:
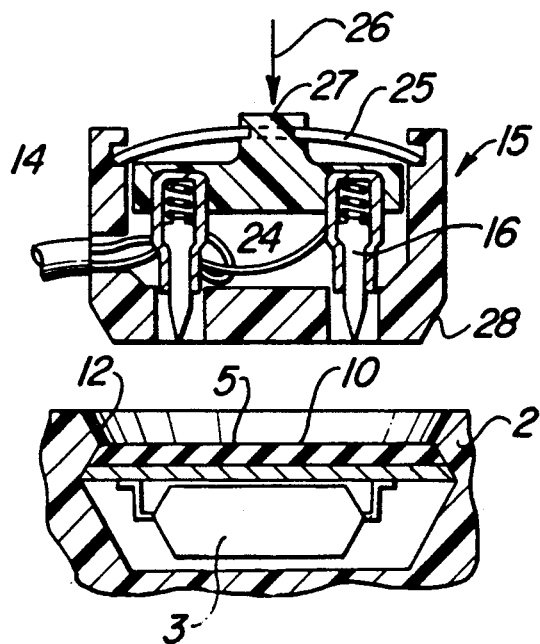
FIG. 5 is an axial sectional view showing the sensor described in the invention, ready to be set against the electronic chip.

In the illustrated example, an electronic chip 2 is attached to the ear 1 of an animal. The electronic chip as shown in FIGS. 3 and 4 include a memory 3 soldered on one face of a conducting plate 4 whose opposite face is an electronical contact surface. This contact surface is divided into a plurality of conducting areas, four in the embodiment shown in FIG. 3, identified as areas 5, 6, 7, and 8. The conducting areas 5, 6, 7, and 8 are separated from each other by gaskets 9 made from an insulating material. The conducting areas 5, 6, 7, and 8 are coated with a soft elastomer film 10 which is both insulating and self-healing. The memory 3 and conducting plate 4 are housed in an insulating base 11 which has a female bevel gear 12 around and above the conducting areas 5, 6, 7, and 8. The female bevel gear 12 flares outwardly from the conducting areas 5, 6, 7, and 8.

For the reading of the electronic chip 2, the invention provides a portable electronic box 13 connected through a flexible cable 14 to a sensor 15. The sensor 15 includes a plurality of conducting telescopic tips equal to the number of conducting areas 5, 6, 7, and 8. In the illustrated example there are four conducting tips, namely tips 16, 17, 18, and 19.

Figure 6:
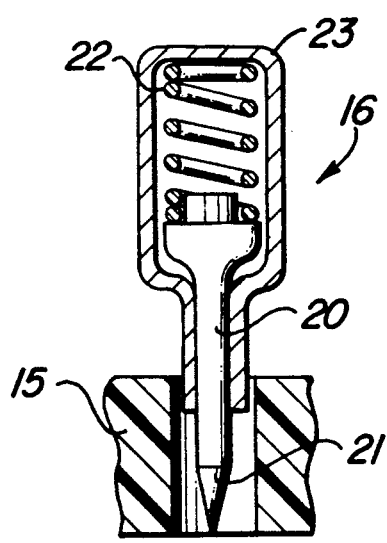
FIG. 6 is an enlarged view showing the detail of one of the telescopic tips illustrated in FIG. 5.
Figure 8:
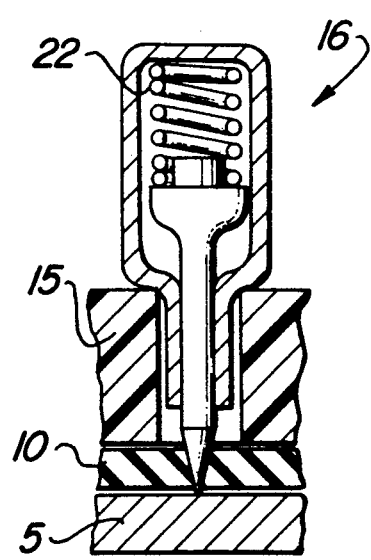
FIG. 8 is a related view showing the detail of one of the contact tips.

Each telescopic tip has the same structure as that illustrated in FIGS. 6 and 8 which show the details of the telescopic tip 16. The tip 16 includes a metal pin 20 which has a pointed end 21. The metal pin 20 slides within the sensor 15 and is biased outwardly by a coil spring 22.

Figure 7:
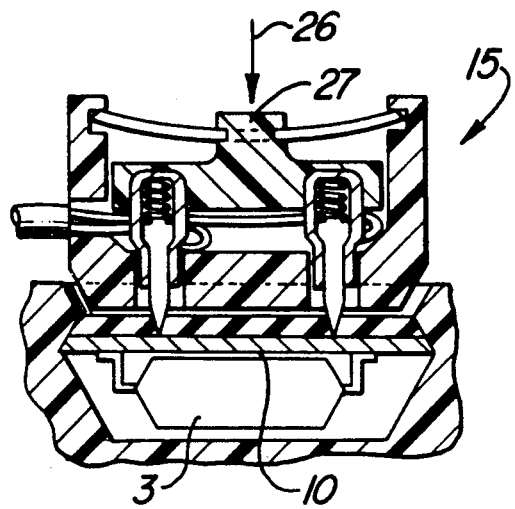
FIG. 7 is a sectional view similar to that of FIG. 5 showing the sensor positioned on the electronic chip.

According to a preferred construction of the invention, the coil spring 22 and the metal pin 20 of each telescopic tip is located inside a sleeve 23. All of the sleeves 23 are attached to a cover 24 resiliently connected to the body of the sensor 15 by an over center spring 25. The over center spring 25 will snap to the position shown in FIG. 7 when pressure, indicated by arrow 26, is applied to a central button 27, provided on the cover 24.

Furthermore, the nose of the sensor 15 has a male bevel gear 28 which mates with the teeth of the female bevel gear 12.

Figure 9:
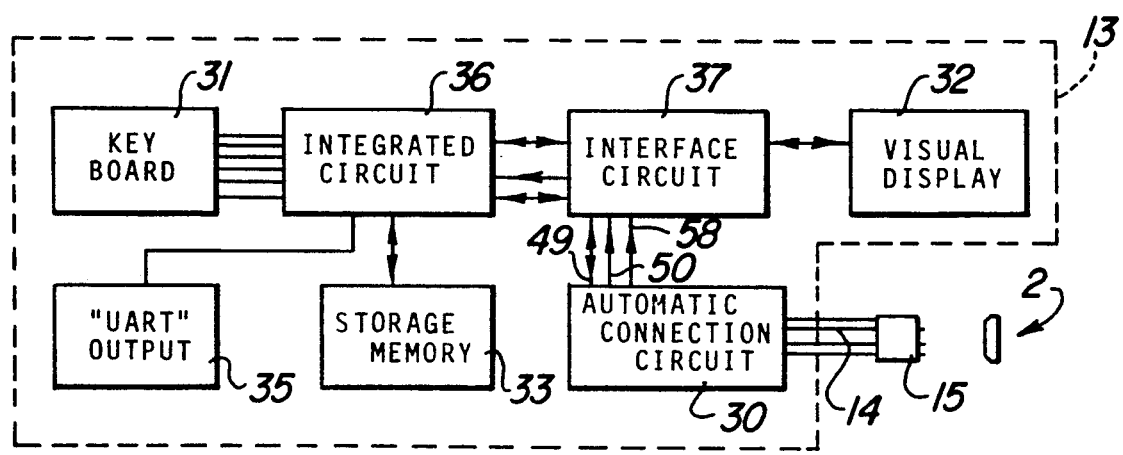
FIG. 9 is a block diagram of the automatic connection electronic circuit.

In the illustrated example, the sensor 15 has four conducting tips, and the flexible cable 14 has four wires, one connected to each of the four tips. As illustrated in FIG. 9, the cable 14 is connected to the portable electronic box 13. The components of the electronic box 13 include a microprocessor and an automatic connection circuit 30.

Figure 10:
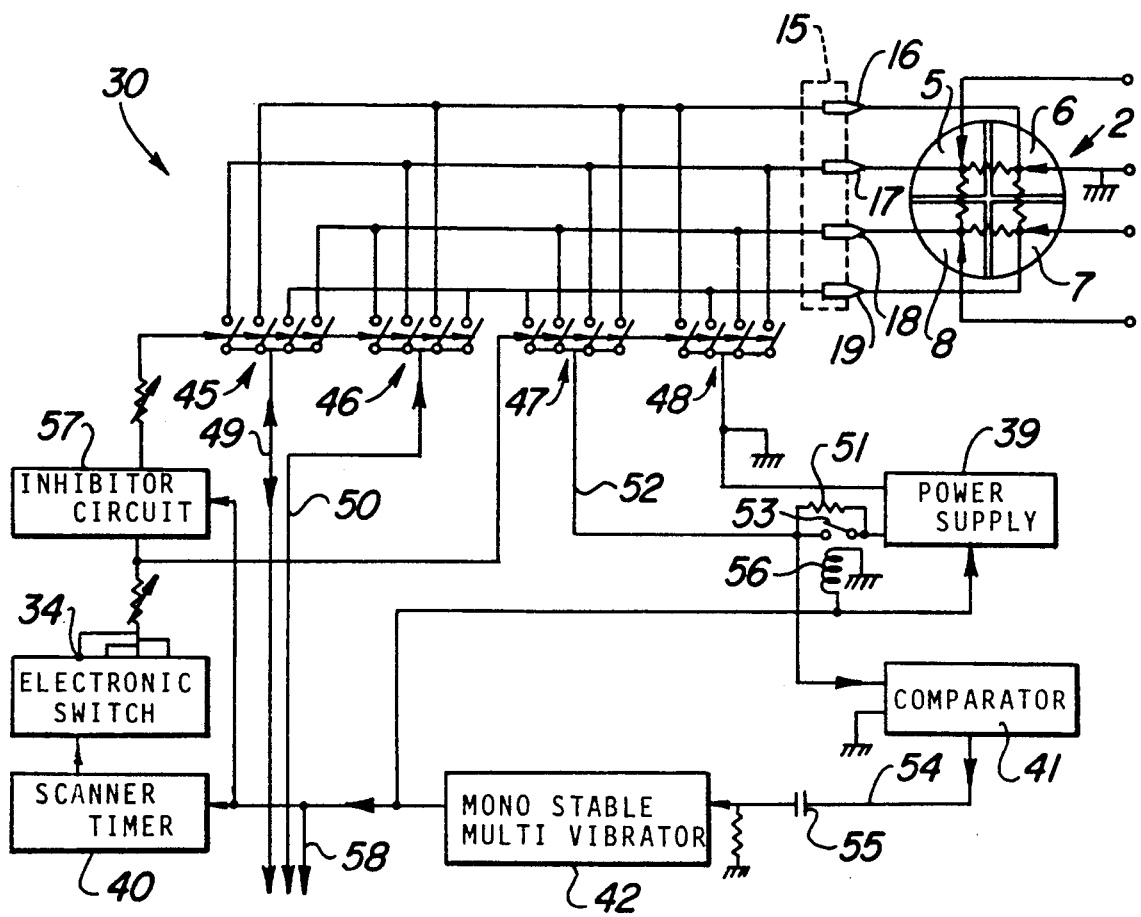
FIG. 10 is a schematic diagram of the circuit used to determine the angular position of the contact tips with reference to the conducting areas of the contact surface.

The microprocessor includes a control keyboard 31, a visual display unit 32 and a storage memory 33. The remaining components of the portable electronic box 13 includes an "U A R T" output 35, an integrated circuit 36 and an interface circuit 37. The automatic connection circuit 30, shown in FIG. 10, has an electronic switch 34 which has four settings controlling the state of four quadruple switches illustrated as mechanical switches 45, 46, 47, and 48. Each quadruple switch has four terminals, one connected to each of the four telescopic tips of the sensor 15. The four terminals of each of the four quadruple switches are connected to the four telescopic tips 16, 17, 18, or 19, as shown, so that in any one state of the four quadruple switches, only one quadruple switch is connected to a respective one of the telescopic tips. For example, the first terminal of the quadruple switch 45 is connected to the second terminal of the quadruple switch 46, to the third terminal of quadruple switch 47 to the fourth terminal of the quadruple switch 48 and to the telescopic tip 17. In a like manner, the other three terminals of the quadruple switch 45 are connected to different telescopic tips and to predetermined terminals on the quadruple switches 46, 47, and 48.

The four poles of the individual switches of the quadruple switch 45 are connected together and to the interface circuit 37 via a data lead 49. In a like manner, the four poles of the quadruple switch 46 are connected together and to the interface circuit 37 via a read/write lead 50. The four poles of the quadruple switch 47 are connected together and to the input of a comparator 41 and to the electrical power output terminal of a power supply 39, via a power lead 52 and a resistance 51. An electrically controlled switch, illustrated as a solenoid actuated switch 53, is connected in parallel with the resistance 51. The individual poles of quadruple switch 48 are connected together and to a second terminal of the power supply 39 which is connected to a common system ground.

The comparator 41 responds to a predetermined voltage appearing at the junction between the resistance 51 and the quadruple switch 47 signifying the power lead 52 is connected to the power input terminal of the memory 3. A monostable multivibrator 42 is connected to the output of the comparator 41 by means of a lead 54 and a capacitor 55. The output of the monostable multivibrator 42 is connected to the power supply 39, a scanning timer 40, a solenoid 56 which when activated closes the switch 53 and an inhibitor circuit 57 connected between the electronic switch 34 and the quadruple switches 45 and 46.

The scanning timer 40 activates the electronic switch 34 to sequentially close, one at a time, the four switches in the quadruple switches 47 and 48 and to close the switches in the quadruple switches 45 and 46 when the inhibitor 57 is activated, as shall be explained in the operation of the automatic connecting device.

The operation of the automatic connecting device is as follows:

Upon activating the portable electronic box 13, the scanning timer 40 activates the electronic switch 34 to sequentially close the four individual switches of each of the quadruple switches 47 and 48, one at a time in a predetermined sequence. The inhibitor 57 in response to the monostable multivibrator not being activated holds the four switches in the quadruple switches 45 and 46 in an open state disconnecting the microprocessor from the memory 3. The switch 53 is also open so that the electrical power applied to the telescopic tips 16, 17, 18, and 19 by the power supply 39 is reduced to a test level by the resistance 51. The comparator 41 monitors the voltage on the power lead 52 between the end of the resistance 51 opposite the power supply 39 and the poles of the quadruple switch 48. When the comparator 41 detects a predetermined voltage it will produce an output which triggers the monostable multivibrator 42 to change state and produce an output signal.

When the operator presses the sensor 15 against the electronic chip 2, the mating bevel gears on the electronic chip and the sensor will align each of the telescopic tips 16 through 19 with a respective one of the conducting surfaces 5, 6, 7, and 8. Depressing the button 27 on the sensor 15 will snap each of the telescoping tips 16 through 19 into electrical engagement with a respective one of the conducting areas 5, 6, 7, and 8. The sequential closing of the individual switches in the quadruple switch 47 will sequentially apply electrical power from the power supply 39 at the test level to each of the telescopic tips in a first predetermined sequence. The sequential closing of the individual switches in the quadruple switch 48 will sequentially ground each of the telescopic tips in a second predetermined sequence. The first and second predetermined sequences are selected so that the telescopic tip connected to the power supply 39 through the quadruple switch 47 is connected to the conducting area 5, 6, 7, and 8 which is connected to the power input terminal of the memory 3, and the telescopic tip connected to ground through the quadruple switch 48 is connected to the ground terminal of the memory 3. This will cause a current to flow through the resistance 51 producing a predetermined voltage drop which is detected at the input of the comparator 41. The comparator 41 in response to the predetermined voltage drop will produce an output which is converted to a trigger pulse by the capacitor 55, which triggers the monostable multivibrator 42 to change state producing an output signal. The output signal produced by the monostable multivibrator 42 signifies that the rotational orientation between the four telescopic tips 16 through 19 and the four conducting areas 5, 6, 7, and 8 has been determined and that commencement of the reading of the content or writing into the memory 3 can now take place.

The output signal generated by the monostable multivibrator 42 will deactivate the scanning timer 40, locking the electronic switch 34 and the quadruple switches 47 and 48 in their current state. In this state the quadruple switch 47 will connect the power input terminal of the memory 3 to the power supply 39, and the quadruple switch 48 will connect the ground terminal of the memory 3 to the common system ground.

At the same time, the output of the monostable multivibrator 42 will energize the solenoid 56 to close the switch 53 so that operating power is now applied to the power input terminal of the memory 3 making it operational. The output of the monostable multivibrator 42 will also disable the inhibitor 57 connecting the output of the electronic switch 34 with the quadruple switches 45 and 46. This will cause the individual switches in the quadruple switches 45 and 46 which correspond to the current state of the electronic switch 34 to close connecting the data lead 49 to the data terminal of the memory 3 and the read/write lead 50 to the read/write terminal of the memory 3. The output of the monostable multivibrator 42 on the line 58 signifies to the microprocessor that the leads 49 and 50 are properly connected, respectively, to the data and read/write terminals of the memory and that it may proceed to read or write data into the memory 3 as required. After a fixed period of time, the monostable multivibrator 42 will return it to its original state in which its output enables scanning the timer 40 and inhibitor 57 and de-energizes the solenoid 56 opening the switch 53. The portable electronic will remain in this state until the sensor 15 is again inserted into a chip 2 and the orientation between the telescopic tips 16 through 19 and the conducting areas 5, 6, 7 and 8 is established by the comparator 41.

The whole operation is completed in a very short period of time, a fraction of a second. After the operation is completed, the operator withdraws the sensor 15 from the chip 2 and sets the animal free.

Although the quadruple switches 45, 46, 47, and 48 are illustrated as mechanical switches, it is to be understood that in the preferred embodiment these switches would be solid state switches providing the necessary high speed switching capabilities needed for the desired high speed operation of the system. Likewise, the solenoid actuated switch 53 would preferably be a solid state switch also.

As is known in the art, the power supply 39 may be a programmable power supply capable of switching between an operational power level and a test level in response to the output of the monostable multivibrator 42. The use of such a programmable power supply would eliminate the resistance 51 and the solenoid actuated switch 53 shown in FIG. 10.

Although the automatic connecting device has been described with reference to a preferred embodiment illustrated in the drawings, it is recognized that those skilled in the art will be able to make changes to the components and electrical circuits without departing from the spirit of the invention as described herein and set forth in the claims.

What is claimed is:

1. A quick automatic connection device comprising:
   an electronic chip having a contact surface, said contact surface having a plurality of conducting areas from one another and arranged about a central axis;
   a sensor having a like plurality of electrically conductive tips, each engageable with one of said plurality of conducting areas when said sensor is pressed against said contact surface;
   alignment means for rotating said sensor with respect to said contact surface to assure each of said electrically conductive tips engage with a respective one of said conducting areas when said sensor is pressed against said contact surface independent of the rotational orientation between said sensor and said electronic chip; and
   electronic circuit means associated with said sensor for sensing the total rotational orientation of said sensor with respect to said electronic chip to identify the particular conducting area to which each of said plurality of electrically conductive tips is engaged.

2. A device as claimed in claim 1, wherein said electrically conductive tips of said sensor are telescopic metal pins biased outward by spring return means, so that when said sensor is pressed against said contact surface each of the said electrically conductive tips is biased by said spring return means against one of said conducting areas.

3. A device as claimed in claim 1, wherein said alignment means comprises a first gear provided on said electronic circuit means whose teeth are designed to mesh with the teeth of a mating gear provided on said sensor, and thus before said electrically conductive tips of said sensor come in contact with said conducting areas, said teeth of said first gear and said mating gear rotationally orienting said sensor with reference to said conducting areas to assure that each electrically conductive tip is aligned with one of said conducting areas.

4. A device as claimed in claim 3, wherein said teeth of said first and said mating gears are bevelled.

5. A device as claimed in claim 1, wherein said contact surface is coated with a soft, insulating and pierceable film for its protection, whereas said electrically conductive tips of said sensor are sharp enough to pierce through said film upon the pressing of said sensor against said contact surface.

6. A device as claimed in claim 1, wherein said electronic chip includes a memory having a stored content connected to said conducting areas of said contact surface.

7. A device as claimed in claim 6, wherein said electronic circuit means has an initial phase of operation during which an impedance measuring circuit scans said electrically conductive tips to determine which one of said conducting areas each of said electrically conductive tips is contacting and a subsequent operating phase allowing said stored content of said memory of said electronic chip to be read or modified.

8. A device as claimed in claim 5, wherein said soft, insulating and pierceable film protecting said contact surface is a self-healing synthetic material which seals itself after said sensor has been withdrawn from said contact surface.

* * * * *

UNITED STATES PATENT AND TRADEMARK OFFICE
CERTIFICATE OF CORRECTION

PATENT NO. : 5,004,897
DATED : April 2, 1991
INVENTOR(S) : Alain Biggio et al

It is certified that error appears in the above-identified patent and that said Letters Patent is hereby corrected as shown below:

Column 6, line 5, after "electronic" insert ---- box ----.

Column 6, line 39, after "areas" insert ---- insulated ----.

Column 6, line 53, delete "total" and insert ---- actual ----.

Signed and Sealed this

Eleventh Day of August, 1992

Attest:

DOUGLAS B. COMER

*Attesting Officer*  *Acting Commissioner of Patents and Trademarks*